Patented Sept. 27, 1932

1,879,071

UNITED STATES PATENT OFFICE

WERNER BUSCH, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRECIPITATION OF HEAVY METAL HYDROXIDES

No Drawing. Application filed May 29, 1929, Serial No. 367,141, and in Germany June 5, 1928.

The present invention relates to a process for precipitating heavy metal hydroxides from aqueous ammoniacal solutions containing heavy metal compounds which are complexly bound to ammonia.

In accordance with the present invention, the precipitation of heavy metal hydroxides from aqueous ammoniacal solutions containing the respective metal bound in a complex with ammonia, particularly the precipitation of copper hydroxide from ammoniacal copper solutions, such as copper amines, is carried out in a simple manner by destroying the metal-ammonia complex contained in the solutions by the addition of an acid. Every acid which destroys the metal-ammonia complex is applicable for this purpose, for instance, sulfuric acid, hydrochloric acid, acetic acid. When, for example to an ammoniacal solution of $Cu(NH_3)_4(OH)_2$ as much acid, for example sulfuric acid, is added as is required for destroying the copper tetrammine complex, the copper hydroxide is flocculated and in a few minutes settles to the bottom of the vessel. This flocculation is also favored by the simultaneous formation of small quantities of a basic salt, such as for example basic copper sulfate, which owing to its granular nature, promotes the precipitation of the copper hydroxide from the solution. An obvious advantage of the process is the fact that the precipitation can be carried out in the cold without colloid formation by the metallic hydroxide, but it is also possible to precipitate the hydroxide at any desired temperature between 0° C. and the boiling point of the solution. The separation of the supernatent solution can then be carried out either by running off this solution or by filtering off the precipitate through a simple filter. Even with rapid filtration the solution is absolutely clear and contains only quite small quantities of metallic salt. The process is applicable for the precipitation of all metals forming complex compounds with ammonia such as for instance, copper, nickel, cobalt, zinc, silver and tungsten, but the chief feature of the present invention is the working up of the highly diluted copper-ammonia containing solutions which are produced in enormous quantities by the cuprammonium silk producing works.

The invention is illustrated by the following example, without being limited thereto:

Example.—1 liter of a weakly alkaline ammoniacal copper salt solution containing 0,01 gram of copper in complex combination is treated with about 6—8 ccm of normal hydrochloric acid with vigorous stirring. after a few minutes the copper hydroxide, containing small quantities of basic chloride, settles to the bottom of the vessel and can be further worked up in the known manner.

I claim:

1. In the process for precipitating copper hydroxide from copper-ammine containing spent liquors of the cuprammonium silk producing works, the step which comprises adding, while stirring, to each liter of an aqueous weakly ammoniacal copper salt solution containing 0,01 gram copper bound in a complex form about 6–8 ccm of normal hydrochloric acid at a temperature of about 20° C.

2. In the process of precipitating copper hydroxide from copper-ammine containing spent liquors of the cuprammonium silk producing works, the step which comprises treating the solution with an acid in amount sufficient to destroy the copper-ammine complex but insufficient to form the normal metal salt of the acid, at a temperature between about 0–100° C.

3. In the process of precipitating copper hydroxide from copper-ammine containing spent liquors of the cuprammonium silk producing works, the step which comprises adding, while stirring, to the solution hydrochloric acid in amount sufficient to destroy the copper-tetrammine complex but insufficient to form the normal metal salt of the acid, at a temperature of about 20° C.

In testimony whereof I have hereunto set my hand.

WERNER BUSCH. [L. S.]